United States Patent [19]

Hawkins et al.

[11] Patent Number: 5,601,719

[45] Date of Patent: Feb. 11, 1997

[54] BIOLOGICAL NUTRIENT REMOVAL PROCESS FOR TREATMENT OF WASTEWATER

[75] Inventors: James M. Hawkins, Charlotte, N.C.; Cindy Wallis-Lage, Prairie Village, Kans.

[73] Assignee: Black & Veatch, Kansas City, Mo.

[21] Appl. No.: 584,518

[22] Filed: Jan. 11, 1996

[51] Int. Cl.$^6$ .................................................. C02F 3/30
[52] U.S. Cl. ........................ 210/605; 210/621; 210/623; 210/903; 210/906; 210/630
[58] Field of Search .................... 210/605, 621, 210/623, 624, 626, 630, 903, 906

[56] References Cited

U.S. PATENT DOCUMENTS

| | | | |
|---|---|---|---|
| 2,788,127 | 4/1957 | Davidson . | |
| 2,875,151 | 2/1959 | Davidson . | |
| 3,236,766 | 2/1966 | Levin | 210/906 |
| 3,964,998 | 6/1976 | Barnard | 210/903 |
| 4,056,465 | 11/1977 | Spector | 210/605 |
| 4,162,153 | 7/1979 | Spector | 210/605 |
| 4,183,809 | 1/1980 | Klayswijk et al. | 210/605 |
| 4,488,967 | 12/1984 | Block et al. | 210/605 |
| 4,867,883 | 9/1989 | Daigger et al. | 210/605 |
| 4,874,519 | 10/1989 | Williamson | 210/605 |
| 4,999,111 | 3/1991 | Williamson | 210/605 |
| 5,022,993 | 6/1991 | Williamson | 210/605 |
| 5,098,572 | 3/1992 | Framp et al. | 210/903 |
| 5,128,040 | 4/1992 | Molof et al. | 210/605 |
| 5,182,021 | 1/1993 | Spector | 210/903 |
| 5,480,548 | 1/1996 | Daigger et al. | 210/906 |

OTHER PUBLICATIONS

Levin, Gilbert V. et al., "Metalbolic Uptake of Phosphorus by Wastewater Organisms", *Journal WPCF* vol. 37, No. 6, Jun. 1965, pp. 800–821.

EPA Design Manual, "Phosphorus Removal", EPA/625/1–87/001, Sep. 1987.

*Primary Examiner*—Christopher Upton
*Attorney, Agent, or Firm*—Hovey, Williams, Timmons & Collins

[57] ABSTRACT

An apparatus and method are provided that are useful in a process for treating organic wastewater for the removal of phosphorus and nitrogen compounds. The apparatus includes an anoxic zone, an oxic zone, and an anaerobic treatment zone, each having therein microorganisms that are operable to affect biological denitrification, BOD oxidation, luxury-uptake of phosphorus and formation of nitrates.

12 Claims, 1 Drawing Sheet

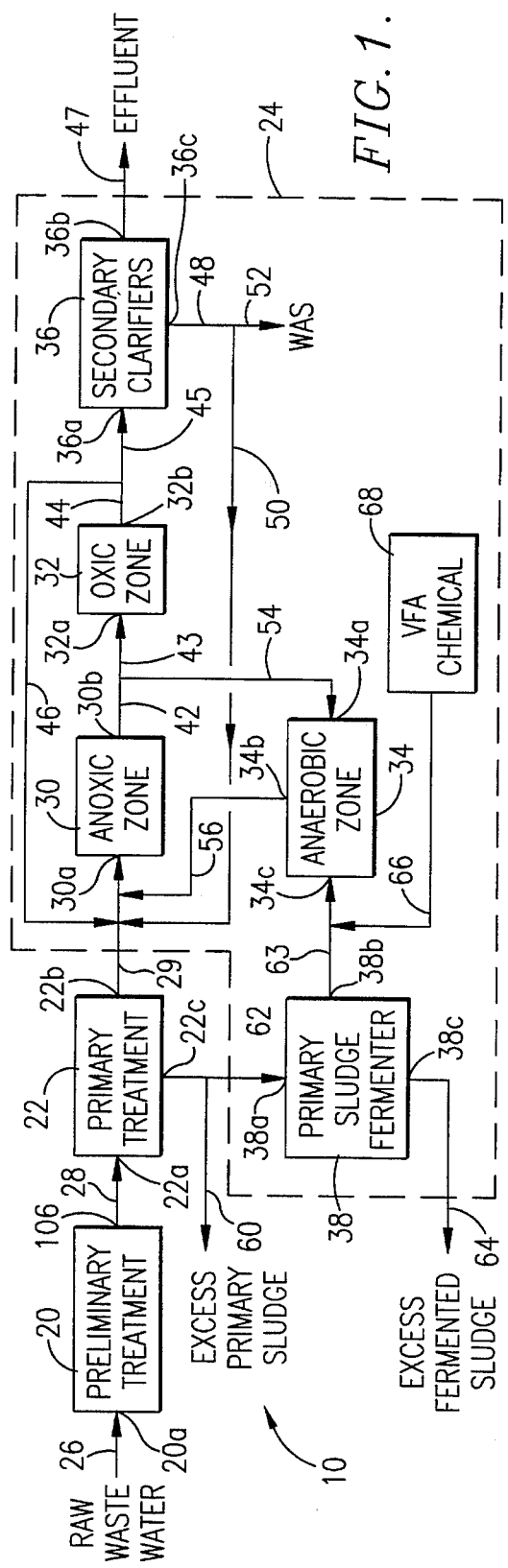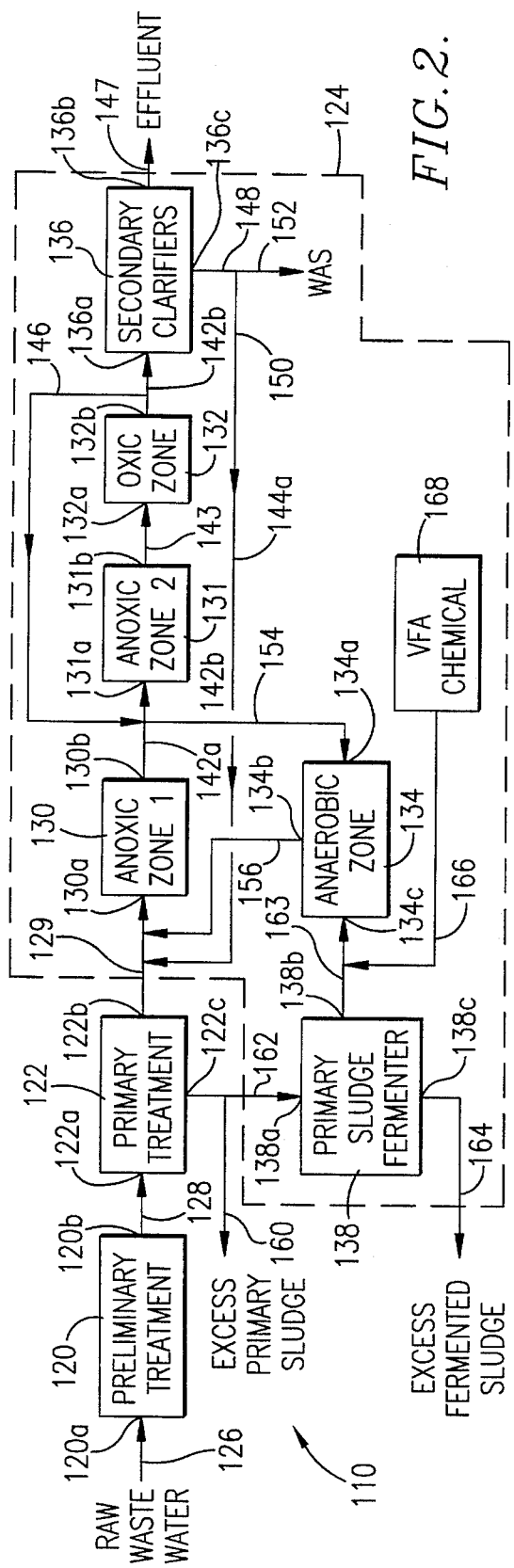

BIOLOGICAL NUTRIENT REMOVAL PROCESS FOR TREATMENT OF WASTEWATER

FIELD OF THE INVENTION

This invention relates to an improved high rate activated sludge process for treating organic wastewater containing undesirable levels of contaminants, including organic matter, along with phosphorus and nitrogen compounds in dissolved or suspended form. More particularly, this invention is concerned with an improved biological process for the removal of such contaminants from the wastewater.

DESCRIPTION OF THE PRIOR ART

Municipal and industrial wastewaters, when left untreated, can contain undesirably high levels of phosphorus and nitrogen compound contaminants. Discharge of such nutrient rich wastewaters to receiving surface waters, such as lakes, rivers, or streams, can create serious pollution problems. The mineral constituents of the wastewater, comprised primarily of the phosphorus and nitrogen compounds, are believed to cause fertilization of receiving waters and promotion of undesirable, rapid and extensive growth of photosynthetic organisms, resulting in eutrophication of the surface waters. Further, many of the surface waters serve as water supply sources, and therefore, the concentration of phosphorus and nitrogen contaminants in municipal and industrial wastewater effluents must be substantially reduced prior to discharge into surface waters to comply with ever more stringent state and federal requirements.

In the past, a wide range of physical, chemical and biological processes have been proposed for controlling the level of various contaminants in wastewater effluents. For example, it has long been known to use an activated sludge process, under aerobic conditions, for the removal of biochemical oxygen demand (BOD) from untreated wastewater. In this process, untreated wastewater is introduced into a suspension of microorganisms to form a mixed liquor. The mixed liquor is aerated to furnish oxygen for biological respiration, resulting in biological absorption, assimilation and metabolic oxidation of BOD. After a sufficient retention time under aerobic conditions, the mixed liquor is next introduced into a clarifier or sedimentation basin in which biomass separates as settled sludge from the liquid. The treated liquid then overflows into a receiving stream for discharge into receiving waters. This process is not totally effective though, for removing phosphate and nitrogen compounds from wastewater.

A number of processing techniques have been proposed in recent years and are aimed at the modification of conventional aerobic activated sludge processing to effect removal of phosphorus and nitrogen from wastewater prior to discharging to a receiving water.

U.S. Pat. Nos. 2,788,127 and 2,875,151 to Davidson disclose an anaerobic-aerobic process in which untreated wastewater is first subjected to anaerobic treatment, followed by aerobic treatment. A portion of the activated sludge formed during aerobic treatment is recycled back and mixed with the untreated wastewater which is to be subjected to anaerobic treatment. The patents assert that the microorganisms undergo unusual stimulation when subjected to anaerobic treatment thus enhancing decomposition of organic waste when it is subjected to aerobic conditions. The Davidson processes do not address denitrification and are subject to adverse effects from wastewater inorganic oxygen spikes in the anaerobic zone.

U.S. Pat. No. 3,236,766 to Levin discloses an anaerobic-aerobic process which removes phosphorus by taking advantage of the so-called "luxury" uptake of orthophosphate from wastewater. "Luxury" uptake of phosphate is a biological metabolic process through which microorganisms can take-up phosphate in excess of metabolic requirements. "Luxury" uptake is described in detail in G. Levin and J. Shapiro, "Metabolic Uptake of Phosphorus by Wastewater Organisms", *Journal Water Pollution Control Federation*, Vol. 37, No. 6, pp. 800–821 (June 1965). The *Levin* reference teaches that the metabolism of a single unit of glucose, or other carbohydrate, by aerobic microorganisms will be attended by the synthesis of numerous units of ATP (adenosine triphosphate) derived from ADP (adenosine diphosphate). For each unit of ATP synthesized from ADP, a unit of orthophosphate is removed from the wastewater. Thus, the metabolism of glucose or carbohydrates, by aerobic microorganisms is said to cause the rapid "uptake" of dissolved orthophosphate present in the wastewater.

In the process of the '766 Patent which employs the concept of "luxury" uptake, wastewater is mixed with activated sludge containing microorganisms "stripped" of phosphate (by a side-stream process step referred to below) under aerobic conditions. Under the aerobic conditions of the process, biological metabolism of biodegradable organics occurs, and at the same time, the uptake of dissolved orthophosphate compounds from the activated sludge mixed liquor takes place. A substantially phosphate-free effluent liquid is produced and a phosphate-rich activated sludge is separated from the mixed liquor. Next, a portion of the phosphate-rich activated sludge is held under low pH ($<6.5$) and anaerobic conditions to induce the intercellular orthophosphate to "leak out" of the activated sludge into a liquid phase. The liquid phase containing the orthophosphate is separated from the sludge and is thereafter chemically treated to precipitate the phosphate. The sludge side-stream containing microorganisms "stripped" of phosphorus is next mixed with incoming wastewater that is to be maintained under aerobic conditions, after which the cycle repeats itself.

The process disclosed in the '766 Patent suffers the disadvantage of requiring pH adjustment and chemical precipitation to remove phosphorus from the mixed liquid. In the '766 Patent, chemical precipitation appears to be the critical link in meeting effluent phosphorus limits. The combination of lowering pH, as well as adding chemical, increase process complexity and operating costs. Further denitrification does not take place in the process of the '766 Patent.

Following Levin's work, later research indicated that a bacterial group called *Acinetobacter-Moraxella-Mima* is the primary microorganism responsible for phosphorus removal. In order for the bacteria to more effectively remove phosphorus by "luxury" uptake under aerobic conditions, the bacteria must first be "conditioned" by exposure to an anaerobic environment containing a selected substrate. The substrate is anaerobically absorbed by the bacteria in the form of poly-B-hydroxybutyrate (PHB). The substrate is absorbed (but not metabolized) under anaerobic conditions by means of hydrolysis of ATP, which in turn provides energy for active transport of substrate into microorganisms for later use. The anaerobic hydrolysis of ATP results in the release of a certain quantity of orthophosphate from the microorganisms which is an indicator that the "luxury" uptake mechanism is in operation. The released orthophosphate is removed with the other orthophosphate indigenous in the wastewater as part of the "luxury" uptake occurring under aerobic conditions. "Luxury" uptake occurs through the metabolism of BOD under aerobic conditions. With the metabolism of BOD, ATP is derived from ADP. For each unit of ATP created, a unit of orthophosphate is removed from the wastewater.

Many other modified activated sludge processes were thereafter developed to provide for improved removal of phosphorus and nitrogen from untreated wastewater by employing anaerobic-anoxic-aerobic process treatment. These processes have been extensively described in the literature. Representative examples are discussed below.

U.S. Pat. No. 4,056,465 discloses a process in which wastewater is mixed with recycled activated sludge in an initial contact zone maintained under anaerobic conditions so as to be substantially free of dissolved oxygen and $NO_x$ (i.e., nitrates and nitrites). Under anaerobic conditions, selective production of non-bulking microorganisms which are capable of absorbing substrate occurs. The effluent from the anaerobic zone is next treated in a contact zone held under anoxic conditions in which dissolved oxygen content does not exceed 0.7 ppm and $NO_x$ concentration exceeds 2 ppm (expressed as elemental nitrogen). The effluent formed in the anoxic zone is directed to a contact zone held under aerobic conditions in which dissolved oxygen content is at least 1 ppm (cf. FIG. 2 of the '465 patent). Effluent from the aerobic zone is directed to a clarifier where sludge is settled and a portion of the sludge forming a return activated sludge stream is directed to the anaerobic contact zone. A portion of the oxic contact zone effluent is recycled to the anoxic zone. The anaerobic zone is held under strictly anaerobic conditions to effect the desired selective production of non-bulking microorganism species that are also capable of removing phosphates under aerobic conditions. In the aerobic contact zone, substrate absorbed by the microorganisms are oxidized and, in the process, phosphates are removed from the mixed liquor. If the anoxic zone is substantially free of dissolved oxygen (less than 0.7 ppm), the microorganisms transfer electrons to $NO_x$. $NO_x$ replaces dissolved oxygen as the final electron acceptors in the respiration chain of microorganisms in wastewater as soon as the dissolved oxygen concentration is sufficiently low. In the process, nitrates and nitrites are reduced to nitrogen gas, $N_2O$ gas and other minor forms of nitrogenous gas, which are released to the atmosphere from the anoxic zone. In this way, the '465 Patent proposed a modification of the conventional activated sludge process to improve removal of nitrogen and phosphorus, while selecting for non-bulking biomass that remained highly active, dense and settled rapidly.

Problems can occur, however, when employing the process disclosed in the '465 Patent. If, for example, either the return activated sludge stream or the wastewater influent stream (both of which are introduced into the initial anaerobic zone) contain unacceptably high levels of inorganic oxygen (D.O., $NO_x$ or $SO_x$) the desired anaerobic biological "conditioning" process will be disrupted, resulting in a reduction in total phosphorus removal. The selective production of non-bulking species will also be disrupted by the presence of $NO_x$ or D.O. in the anaerobic zone. In addition, if substrate levels in the wastewater influent introduced into the anaerobic zone become sufficiently low, or if high concentrations of inorganic oxygen (D.O., $NO_x$ or $SO_x$) are present in the wastewater influent, then the "conditioning" of the microorganisms (i.e., absorption and metabolism of substrate) in the anaerobic zone will be disrupted, resulting in a reduction in phosphorus removal in the aerobic zone. Finally, the process in the '465 Patent can suffer a "washout" of microorganisms from the anaerobic zone if sufficiently high surges of influent wastewater flow occur, as can be the case with wastewater plants which experience high infiltration/inflow flows during rain events.

U.S. Pat. No. 4,867,883 discloses a process which also makes use of serially interconnected anaerobic, anoxic and oxic zones. In this process, effluent from the oxic zone is directed to a clarifier where activated sludge is settled and a portion is recycled to the anoxic zone, together with a recycle of nitrified mixed liquor from the oxic zone effluent. A portion of the anoxic effluent is recycled to the anaerobic zone.

The process of the '883 Patent is said to be an improvement over a very similar UCT process developed by the University of Capetown during the mid-1980's, which utilizes a similar flow circuit. The process of the '883 Patent, however, called for the use of staged reactors within each zone to effect a lower mean cell residence time to achieve the same contaminant reduction in the treated wastewater. In the case of the UCT process, the mean residence time was identified as being upwards of 20 days in order to accomplish desired phosphate, nitrate, and BOD levels. The UCT process required longer residence times because the wastewater influent was directed into the anaerobic zone and the wastewater influent was the sole substrate source for the biological conditioning process in the anaerobic zone. The '883 process lowered the mean cell residence time by employing multi-stage reactor configurations for the anaerobic, anoxic and aerobic zones. The '883 patent, thus, claimed an overall rate of phosphorus uptake and denitrification which was accelerated due to the concentration of residual organics which remained relatively high in the first few anaerobic reactors.

There are, however, disadvantages associated with the process disclosed in the '883 Patent, as well as the UCT process (which was disclosed as prior art in the '883 Patent). In both cases, wastewater influent is directed into the anaerobic zone, which can result in unstable or undesirable conditions in the steady state operation of the treatment plant when the wastewater contains either very high levels of inorganic oxygen (dissolved oxygen, $NO_x$, $SO_x$), very low BOD (substrate) levels, or very high influent flow rates. As previously explained, the presence of inorganic oxygen or the lack of substrate in the anaerobic zone will have an adverse impact on phosphorus removal in the oxic zone. In the event that inorganic oxygen levels are present in sufficient quantities in the wastewater influent, the microorganism "conditioning" process (normally requiring a residence time of between 0.5–1.5 hours) will be supplanted by the metabolic process in which substrate is oxidized.

If the influent wastewater is substrate deficient, as is the case when the wastewater contains low BOD levels compared to the nutrient level, the conditioning process will simply slow down or not occur at all. The net effect in both cases is that the phosphorus removal process in the aerobic zone is adversely affected. Utilizing the influent wastewater as the substrate source also adds risk to the biological phosphorus removal process due to the variability of wastewater characteristics. Influent waste characteristics are a reflection of the service area and can have significant daily variation. These variations could adversely impact performance. Furthermore, if the wastewater influent undergoes sufficiently high increases in flow rates, a "washout" of the microorganisms in the anaerobic zone can occur. If a washout occurs, the entire biological treatment process will taper off, perform erratically, or discontinue altogether.

U.S. Pat. Nos. 4,874,519 and 4,999,111 dealt with the problem of modifying existing wastewater facilities to accomplish biological phosphorus removal. The '519 and '111 Patents teach the introduction of pre-treated wastewater into an aerobic zone where BOD levels are reduced and nitrogen, in the form of ammonia in the wastewater, is converted into nitrate or nitrite. The '519 and '111 Patents are directed to retrofitting existing facilities, often involving trickling filter pretreatment of wastewater to remove BOD, the BOD levels in the influent wastewater to the secondary treatment plant (serving as a food source for the microorganisms) are often undesirably low (BOD/phosphorus within the range of 7–14 and BOD/TKN below 3.6). The '519 and '111 Patents, disclose the use of fermented raw sludge or acetic acid as a substrate source for the microorganisms contained in the return activated sludge being directed to the anoxic or anaerobic zone (cf. FIG. 7 of the '111 Patent).

The two most significant problems disclosed in the '519 and '111 Patents relate to the location of the anoxic zone and the discharge location of the RAS. In the '519 and '111 Patents, the influent wastewater is directed into the aerobic zone followed by an anoxic zone and second aerobic zone. This configuration does not take advantage of the influent substrate to effect denitrification of the ammonia oxidized to nitrates in the aerobic zone nor does it effect low total nitrogen in the secondary effluent unless a supplemental substrate is added to the anoxic zone. Substrate addition will result in increased solids quantities and can impact the effluent quality with respect to other parameters besides nitrate-nitrogen. If the substrate source is a fermenter, the fermenter liquor added to the anoxic zone can contain nitrogen and phosphorus in addition to BOD. The result can be an increase in the effluent total nitrogen and phosphorus concentrations. Furthermore, the '519 and '111 Patents processes call for the introduction of return activated sludge into the anaerobic zone. As explained above, problems can occur with this flow configuration if the return activated sludge stream contains unacceptably high levels of $NO_x$ which interrupts the "conditioning" process occurring in the anaerobic zone. This problem will be amplified by low levels of denitrification in the anoxic zone.

The teachings disclosed in the U.S. Patents, together with those disclosed Levin article, discussed above are hereby incorporated by reference.

SUMMARY

The present invention overcomes the problems outlined above, and provides an apparatus and method useful in a process for treating organic wastewater to remove phosphorus and nitrogen compounds therefrom. In accordance with the present invention, an apparatus is provided which includes an anoxic zone, an oxic zone, and an anaerobic treatment zone, each having microorganisms, including bacterial agents, contained therein. In addition, a supplemental substrate in the form of fermented primary sludge or a chemical is provided.

The anoxic zone is provided with bacteria which are maintained under anoxic conditions and are operable to effect biological denitrification. The oxic zone is provided with bacteria which are maintained under aerobic conditions and are operable to oxidize BOD, undergo luxury phosphorus uptake and form nitrates.

A source of biodegradable substrate is introduced into the anaerobic zone. The anaerobic zone is provided with bacteria which are maintained under anaerobic conditions and are operable to absorb at least a portion of said substrate which effects a release of orthophosphate.

The wastewater is introduced into the anoxic zone to effect bacterial denitrification and reduction of BOD.

An anoxic effluent stream is discharged from the anoxic zone and is directed into the oxic zone. A recycle anoxic effluent stream is introduced into the anaerobic zone. An anaerobic effluent stream is discharged from the anaerobic zone and is directed to the anoxic zone. A recycle oxic effluent stream is introduced into the anoxic zone. Activated sludge from the oxic effluent stream is separated from the mixed liquor to form a return activated sludge stream. The return activated sludge stream is introduced into the anoxic zone.

The environmental conditions in the anoxic zone must be free of residual dissolved oxygen, and the anoxic zone preferably contains dissolved oxygen concentrations less than 0.5 mg/L.

The environmental conditions in the anaerobic zone must be free of residual dissolved oxygen and $NO_x$, both of which are preferably held at concentrations less than 0.5 mg/L.

The environmental conditions in the oxic zone must be such that sufficient concentrations of dissolved oxygen are present to permit metabolic oxidation of carbonaceous organic material, and dissolved oxygen concentrations of at least 0.5 mg/L are preferably maintained.

The flow of recycled oxic effluent entering the anoxic zone may range between 200 and 400% of the wastewater influent entering the anoxic zone. The return activated sludge stream flowing into the anoxic zone may be as high as 100% of solids settled from the oxic zone effluent stream. The recycle anoxic effluent stream may range between 50 and 100% of the influent wastewater entering the anoxic zone.

BRIEF DESCRIPTION OF THE DRAWINGS

FIG. 1 is a schematic diagram of the apparatus used for the process of treating organic wastewater containing undesirable levels of phosphorus and nitrogen compounds.

FIG. 2 is a schematic diagram of an alternative embodiment of the present invention employing two anoxic zones to enhance phosphorus and nitrogen removal.

DETAILED DESCRIPTION OF THE PREFERRED EMBODIMENTS

The apparatus broadly designated 10 in FIG. 1 permits the economical treating of wastewater containing undesirable contaminant levels of BOD, phosphorus and nitrogen, to reduce the concentration of such contaminants. Apparatus 10 includes a preliminary treatment system 20, a primary treatment system 22, and a secondary treatment system 24.

Turning first to a description of the system configuration, raw wastewater, directed through line 26, enters the preliminary treatment system 20 through inlet 20a. Preliminary treatment effluent exits the preliminary treatment system 20 through outlet 20b and is directed to the primary treatment inlet 22a via line 28. (As used herein, the term "line" is broadly used to designate piping, conduit, or any other means by which fluid may be conveyed from one point in the process to another.) Primary effluent is discharged from the primary treatment system 22 through outlet 22b and is directed to the secondary treatment system 24 via line 29.

The secondary treatment system 24 includes an anoxic zone 30, an oxic zone 32, an anaerobic zone 34, secondary clarifiers 36, a primary sludge fermenter 38, and a purchased short chain fatty acid chemical source 68. As used herein, "short chain" is intended to mean C2–C5 organic chains containing two to five carbons with a preference for organic chains containing two to three carbons.

Primary treatment effluent discharged from primary treatment outlet 22b is directed via line 29 to anoxic zone inlet 30a where it undergoes bacterial denitrification and reduction of BOD levels. An anoxic effluent stream is discharged from anoxic zone outlet 30b into line 42 and is split into an oxic zone influent stream and an anoxic recycle stream. The oxic zone influent stream is directed to oxic zone inlet 32a via line 43 which joins line 42. In the oxic zone 32, the remaining BOD in the wastewater undergoes bio-oxidation, the ammonia is oxidized to nitrates, and the orthophosphate is taken into the bacteria by means of the "luxury" uptake mechanism discussed above. An oxic zone effluent stream is discharged from the oxic zone outlet 32b into line 44, and is thereafter split into an oxic recycle stream and a secondary clarifier influent stream. Line 46 joins line 44 and directs the oxic recycle stream to the anoxic zone 30 via line 29. The secondary clarifier influent stream is directed to the secondary clarifier via line 45 which joins line 44.

Liquid effluent discharged from secondary clarifiers 36 through outlet 36b is directed via line 47 to downstream treatment process or receiving waters. Settled activated sludge is discharged from secondary clarifiers outlet 36c into line 48, which splits into lines 50 and 52. Line 50 joins line 29 and directs a portion of the activated sludge, in the form of a return activated sludge stream, into the anoxic zone 30. Line 52 directs the balance of the activated sludge to waste-handling facilities.

Line 54 joins line 42 and directs the anoxic recycle stream to the anaerobic zone inlet 34a. Anaerobic effluent exits the anaerobic zone 34 through outlet 34b and is directed via line 56, which joins with line 29, to anoxic zone inlet 30a.

A substrate source, in the form of short chain organics, is directed into anaerobic zone 34 via inlet 34c. The substrate source may be derived from fermented primary sludge decant, purchased chemical or an industrial waste. If fermented sludge is used, sludge from the primary treatment system 22 exits outlet 22c and is directed to the primary sludge fermenter 38 via line 62. Excess primary sludge is discharged to solids handling facilities via line 60, which joins line 62. Excess fermented sludge exits the primary sludge fermenter 38 through outlet 38c and is directed to solids handling facilities through line 64. Fermented primary sludge decant is discharged through outlet 38b to line 63 and into the anaerobic zone 34 via inlet 34c. If purchased chemical is used, stored chemical 68 is directed via line 66 to line 63 and ultimately into the anaerobic zone 34 via inlet 34c.

In operation, raw municipal or industrial wastewater enters the preliminary treatment system 20 which is a conventional treatment process typically consisting of screening and grit removal. The preliminary treatment effluent is directed through line 28 through the primary treatment system 22, which includes conventional treatment processing to remove heavy solids and organic matter. The primary treatment effluent is discharged from the primary treatment system 22 and is introduced into the secondary treatment system 24. In secondary treatment system 24, the anoxic zone 30 is the initial zone of contact and admixture of the incoming wastewater (through line 29) with the return activated sludge stream (recycled from the secondary clarifiers 36 through line 50), anaerobic zone effluent (from anaerobic zone 34 through line 56) and the oxic effluent recycle stream flowing through line 46. The anoxic zone 30, which may be divided into two or more anoxic cells, contains microorganisms which operate to convert nitrates and nitrites in the oxic effluent recycle stream, flowing through line 46, and the return activated sludge stream, flowing through line 50, into nitrogen gas. Following conversion in the anoxic zone 30, the nitrogen gas is released through the anoxic zone 30 liquid surface to atmosphere.

Under anoxic conditions, microorganisms present in anoxic zone 30 use the nitrates/nitrites as electron acceptors while oxidizing carbonaceous organic matter in the wastewater. Because the microorganisms will select dissolved oxygen (D.O.) over nitrites/nitrates as an electron acceptor, the environmental conditions in the anoxic zone 30 must be free of residual D.O., preferably D.O. concentrations less than 0.5 mg/L.

Gentle stirring is required in each anoxic zone 30 to mix the cell contents. Typically, stirring is provided by means of mechanical mixing.

The recycle oxic stream entering the anoxic zone 30 through line 46 is set at a rate that is a function of the influent nitrogen concentration and the target effluent total nitrogen concentration. For typical domestic wastewater characteristics, the recycle oxic effluent flow entering the anoxic zone 30 may be in the following ranges for a given effluent nitrogen concentration assuming low effluent TSS concentrations:

Total nitrogen=3–6 mg/L, recycle flow>400% of Influent flow

Total nitrogen=6–10 mg/L, recycle flow=300–600% of Influent flow

Total nitrogen>10 mg/L, recycle flow=100–400% of Influent flow

The return activated sludge stream flowing into the anoxic zone 30 through line 50 is operated at a flow rate equal to 20–100% of the influent wastewater flow to ensure that the microorganism population remains sufficiently high in the anoxic zone 30, oxic zone 32 and the anaerobic zone 34.

Effluent from the anoxic zone 30 is discharged through line 42 into the oxic zone 32. The purpose of the microorganisms in the oxic zone is to oxidize the organic matter to $CO_2$ and water, oxidize ammonia entering the oxic zone 32 to nitrates and nitrites, and to bring about the "luxury" uptake of phosphorus from the mixed liquor. Environmental conditions in the oxic zone 32 must be aerobic, preferably with D.O. concentrations of at least 0.5 mg/L.

The mixed liquor in the oxic zone 32 should be well mixed.

The detention time in the oxic zone 32 is dictated by the time required to oxidize ammonia to $NO_x$. To maintain complete nitrification of the mixed liquor, a solid residence time in the range of ten days at 10° C. and six days at 20° C. is typically required. The resulting hydraulic residence time in the oxic zone varies between four to ten hours to achieve soluble BOD concentration of 2 to 10 mg/l.

Mixed liquor discharged from the oxic zone 32 through line 44 which joins line 45 to the secondary clarifiers 36 is settled in the secondary clarifiers 36. A majority of the settled solids are returned to the anoxic zone 30 in the return activated sludge stream flowing through line 50 to maintain the desired microorganism population in the secondary treatment system 24. Excess solids discharged from the secondary clarifiers 36 are wasted to solids processing through line 52.

Anaerobic zone 34 receives the recycle anoxic stream from the anoxic zone 30 (which has been denitrified) through line 54 and also receives a supplemental substrate through line 63. The recycled anoxic effluent stream flowing through line 54 is typically designed at a recycle rate of between 50 and 100% of the incoming wastewater flow (i.e., raw wastewater). The substrate source can be developed from fermentation of primary sludge in the primary sludge fermenter 38 or may be industrial waste or purchased chemical in the form of biodegradable short chain organics provided from chemical storage 68. The purpose of the anaerobic zone 34, assuming microorganisms are present and operable, is to bring about the biological "conditioning" processes which produce the subsequent "luxury" uptake of phosphorus in the oxic zone 32. It is critical that the anaerobic zone be substantially free of D.O. and $NO_x$, preferably possessing concentrations less than 0.5 mg/L of each. The anaerobic zone may be exposed to the atmosphere, thus, it is not necessary to cover the anaerobic zone 34. Gentle stirring is required in the anaerobic zone to mix the cell contents. It is important that the mixing system minimize surface agitation in order to minimize oxygenation of the mixed liquor contained therein.

Primary sludge may optionally provide the short chain organics to the anaerobic zone 34 via line 63 as an auxiliary substrate source for the microorganisms therein. For the purpose of creating fermented sludge, up to 100% of the primary settled sludge collected in the primary treatment plant 22 may be supplied through line 62 to the primary sludge fermenter 38. In the fermenter 38, complex organic compounds are converted by fermentation to simple organic compounds which can be readily used by the phosphorous removing microorganisms in the anaerobic zone 34 during the "conditioning" process. These simple organic compounds are commonly referred to as volatile fatty acids. A settling zone (not shown) is incorporated into the fermenter to allow solids separation of the fermented sludge. The clear decant liquid stream is discharged via line 63 into the anaerobic zone 34. Excess primary sludge and the settled fermented sludge are discharged to solids handling facilities through, line 60 and line 64, respectively, for solids disposal.

The invention, as described above, is more effective than the prior art processes in removing BOD, nitrogen and phosphorus from wastewater under adverse operating conditions. For example, because the wastewater influent streams and the return activated sludge stream are introduced into the anoxic zone 30, rather than into the anaerobic zone 34, unexpected spikes in inorganic oxygen concentration (D.O., $NO_x$ and $SO_x$) in the wastewater influent and spikes in the concentration of $NO_x$ in return activated sludge stream, will have little or no impact on the "conditioning" process occurring in the anaerobic zone. Thus, such spikes will have little or no impact on the capacity of the secondary treatment system to uptake phosphorus compounds under aerobic conditions. Further, a deficiency of BOD in the secondary treatment influent will not adversely impact the invention's ability to remove phosphorus and nitrogen from wastewater because the anaerobic zone 34 is provided with an auxiliary substrate source supplied from either the primary sludge fermenter 38 or the purchased VFA chemical storage 68.

Another advantage associated with the present invention is that it is less susceptible to "washout" experienced by those prior art systems which introduce the wastewater influent stream into the anaerobic zone. In the present invention, wastewater influent is introduced into the anoxic zone 30 which is capable of absorbing substantial surges in secondary influent flow rates, thus preventing abnormally high flow rate conditions occurring in the anaerobic zone.

Turning now to other embodiments, a first alternative embodiment of the present invention provides a process which differs from apparatus 10 described above in that two anoxic zones are included. As shown in FIG. 2, apparatus 110 of the first alternative embodiment includes a preliminary treatment system 120, a primary treatment system 122, and a secondary treatment system 124.

Raw wastewater, directed through line 126, enters the preliminary treatment system 120 through inlet 120a. Preliminary treatment effluent exits the preliminary treatment system 120 through outlet 120b and is directed to the primary treatment inlet 122a via line 128. Primary effluent is discharged from the primary treatment system 122 through outlet 122b and is directed to the secondary treatment system 124 via line 129.

The secondary treatment system 124 includes a first anoxic zone 130, a second anoxic zone 131, an oxic zone 132, an anaerobic zone 134, secondary clarifiers 136 and a primary sludge fermenter 138 or purchased short chain organic chemical 168. First and second anoxic zones 130, 131 may include a structure which divides each zone into two or more cells.

Primary treatment effluent is discharged from primary treatment outlet 122b and is directed via line 129 to the first anoxic zone inlet 130a where it undergoes bacterial denitrification and BOD reduction. A first anoxic effluent stream is discharged from the first anoxic zone outlet 130b and into line 142a and is thereafter split into a second anoxic zone influent stream and an anaerobic zone influent stream. The second anoxic zone influent stream is directed via line 142b to the second anoxic zone 131 via inlet 131a where it undergoes further bacterial denitrification and BOD reduction. A second anoxic effluent is discharged from a second anoxic zone outlet 131b and is directed via line 143 to oxic zone 132 via inlet 132a. An oxic zone effluent stream is discharged from the oxic zone outlet 132b via line 144a and is thereafter split into an oxic recycle stream and a secondary clarifier influent stream. Line 146, which joins line 144a, directs the oxic recycle stream to the second anoxic zone 131 by joining line 142b. Line 144b, which joins 144a, directs the secondary clarifier influent stream to secondary clarifier inlet 136a.

Liquid effluent discharged from secondary clarifiers 136 through outlet 136b is directed via line 147 to downstream treatment process or receiving waters. Settled activated sludge is discharged from secondary clarifiers outlet 136c into line 148, which splits into lines 150 and 152. Line 150, which joins line 129, directs a portion of the activated sludge, in the form of a return activated sludge stream, into the first anoxic zone 130. Line 152 directs the balance of the activated sludge to waste-handling facilities.

Line 154 joins line 142a and directs the first anoxic zone recycle stream to anaerobic zone 134 via anaerobic zone inlet 134a. Anaerobic effluent exits the anaerobic zone 134 through outlet 134b and is directed via line 156, which joins with line 129, anoxic zone inlet.

A substrate source, in the form of short chain organics, is directed into anaerobic zone 134 via inlet 134c. The substrate source may be fermented primary sludge decant, purchased chemical or industrial waste. If fermentation is used, sludge from the primary treatment system 122 exits outlet 122c and is directed to the primary sludge fermenter 138 via line 162. Excess primary sludge is discharged to solids handling facilities via line 160, which joins line 162. Excess fermented sludge exits the primary sludge fermenter 138 through outlet 138c and is directed to solids handling facilities through line 164. Fermented primary sludge decant is discharged through outlet 38b to line 163 and into anaerobic zone 134 via inlet 134c. If purchased chemical is used, stored chemical 168 is directed via line 166 to line 163 and ultimately into the anaerobic zone 134 via inlet 134c.

The purpose of first anoxic zone 130 is to provide an environment for denitrification for the return activated sludge stream supplied by line 150 to line 129, prior to its introduction into the anaerobic zone 134. The purpose of the second anoxic zone 131 is to provide an environment for denitrification of the oxic recycle stream being supplied through line 146. Separation of the denitrification process into two separate zones to treat each recycle stream allows independent control of nitrogen and phosphorus removal to permit each or both to be optimized under varying load conditions. The first anoxic zone 130 receives the highest substrate concentration from the anaerobic zone 134 and from the primary treatment effluent, in the form of BOD, which provides a stronger driving force to more completely denitrify the return activated sludge stream flowing through line 150. More complete denitrification of the return activated sludge stream minimizes the potential of $NO_x$ in the first anoxic recycle stream to the anaerobic zone 134, thus limiting conditions which adversely impact biological "conditioning" and subsequent phosphorus uptake in the oxic zone 132. The oxic recycle stream flowing through line 146 to line 142b and into the second anoxic zone 131 permits adjustments to be made to obtain target oxic zone effluent $NO_x$ concentration. The substrate concentration introduced into the second anoxic zone 131 will be lower than that associated with the primary treatment effluent entering the first anoxic zone 130 which may result in incomplete denitrification. However, incomplete denitrification in the second anoxic zone 131 will not adversely impact biological "conditioning" and subsequent phosphorus removal.

A third embodiment (not shown) of the present invention may employ a second anoxic zone and a second oxic zone in serial interconnection with the oxic zone of the preferred embodiment. Such a configuration provides extended denitrification of oxic zone effluent. The second anoxic zone will further provide "slow rate" or "high rate" denitrification. With a "slow rate" process, denitrification of the remaining nitrates in the effluent discharged from the oxic zone is accomplished with endogenous biological respiration. With a "high rate" process, an auxiliary substrate source is provided to the second anoxic zone to assist in the denitrification process. The second oxic zone would yet further provide reaeration of the mixed liquor entering the secondary clarifiers to prevent undesirable anaerobic conditions from developing in the secondary clarifiers and provide treatment of carbonaceous BOD breakthrough from the second anoxic zone if a supplemental substrate is used. The second anoxic and oxic zones may be either single cell or may be compartmentalized into two or more cells.

Other alternative embodiments may include various flow configurations of the alternative embodiments described above as desired for particular operating conditions and desired results.

We claim:

1. A method of treating wastewater which contains undesirable contaminant levels of BOD, phosphorus and nitrogen, to reduce the concentration of such contaminants, said method comprising the steps of:

providing an anoxic zone, an oxic zone, and an anaerobic treatment zone, each having bacterial agents therein, said anoxic zone being provided with bacteria which are maintained under conditions and are operable to effect biological denitrification, said oxic zone being provided with bacteria which are maintained under conditions and are operable to oxidize BOD, undergo luxury phosphorus uptake and to form nitrates, introducing an organic substrate into said anaerobic zone, said anaerobic zone being provided with bacteria containing stored phosphorus which are maintained under conditions and are operable to undergo biological absorption of at least a portion of said substrate and release of at least a portion of stored phosphorus, introducing said wastewater into the anoxic zone to effect bacterial denitrification and reduction of BOD;

discharging an anoxic effluent stream from said anoxic zone and splitting said anoxic effluent stream into an oxic influent stream and an anoxic recycle stream, directing the oxic influent stream into the oxic zone;

directing the anoxic recycle stream into the anaerobic zone;

discharging an anaerobic effluent stream from said anaerobic zone and directing said anaerobic effluent stream to said anoxic zone;

discharging an oxic effluent stream from said oxic zone, said oxic effluent containing a quantity of activated sludge, directing a portion of said oxic effluent stream in the form of an oxic recycle stream to said anoxic zone and separating at least a portion of said activated sludge from said oxic effluent stream to form a return activated sludge stream; and introducing said return activated sludge stream into said anoxic zone.

2. The method of claim 1, wherein the dissolved oxygen concentration in the anoxic zone is less than 0.5 mg/L.

3. The method of claim 1, wherein the dissolved oxygen concentration and $NO_x$ concentration in the anaerobic zone are less than 0.5 mg/L.

4. The method of claim 1, wherein the dissolved oxygen concentration in the oxic zone is at least 0.5 mg/L.

5. The method of claim 1, wherein the nitrogen concentration in the oxic effluent stream is maintained in the range of 3–6 mg/L when the oxic recycle stream entering the anoxic zone is greater than 400% of the wastewater flow entering the anoxic zone.

6. The method of claim 1, wherein the nitrogen concentration in the oxic effluent stream is maintained in the range of 6–10 mg/L when the oxic recycle stream entering the anoxic zone is in the range of 300–600% of the wastewater flow entering the anoxic zone.

7. The method of claim 1, wherein the nitrogen concentration in the oxic effluent stream is maintained equal to or greater than 10 mg/L when the oxic recycle stream entering the anoxic zone is between 100–400% of the wastewater flow entering the anoxic zone.

8. The method of claim 1, wherein a hydraulic residence time in said oxic zone varies between 4–10 hours to achieve soluble BOD concentration between 2–10 mg/L.

9. The method of claim 1, wherein said anoxic recycle stream is maintained at a recycle rate of 50–100% of wastewater flow.

10. The method of claim 1, wherein said organic substrate is a short chain fatty acid.

11. The method of claim 10, wherein short chain fatty acid comprises three to five carbon fatty acids.

12. A method of biologically treating wastewater containing nitrogen and phosphorus compounds to remove organic matter, phosphorus, and nitrogen compounds from the wastewater, comprising:

a. providing a preliminary and primary treatment area having an inlet and primary effluent liquid outlet, and a sludge outlet;

b. providing a secondary treatment area including an anaerobic zone, an anoxic zone, an oxic zone, a sludge fermenter, a secondary clarifier, and a supplemental substrate source, each said zone having an inlet and an outlet, said sludge fermenter and secondary clarifier having an inlet and a liquid outlet and a sludge outlet;

c. providing a wastewater stream;

d. subjecting wastewater stream to treatment in said preliminary and primary treatment area for removal of grit, heavy solids and organic matter and discharging a primary effluent stream containing a quantity of BOD, nitrogen and phosphorus compounds from said liquid outlet and a primary sludge stream from said primary sludge outlet;

e. introducing said primary effluent stream to said anoxic zone through said anoxic inlet and discharging an anoxic zone effluent from said anoxic zone outlet, said anoxic zone allowing bacteria in suspension in activated sludge to convert nitrates to nitrogenous gasses under anoxic conditions;

f. splitting said anoxic zone effluent into an oxic zone influent stream and an anoxic recycle stream;

g. introducing said oxic zone influent stream into said oxic zone through said oxic zone inlet and discharging an oxic zone effluent from said oxic zone outlet, said oxic zone allowing biological oxidation of BOD, biological nitrification of nitrogenous compounds to nitrates by nitrifying bacteria contained in activated sludge, and the biological luxury uptake of phosphate compounds;

h. splitting said oxic zone effluent into a secondary clarifier influent stream and an oxic recycle stream;

I. introducing said secondary clarifier influent stream into said secondary clarifier through said secondary clarifier inlet and discharging a liquid effluent from said secondary clarifier liquid outlet and sludge effluent stream from said secondary sludge outlet;

j. splitting said secondary sludge effluent stream into a return activated sludge stream and a solids processing stream;

k. introducing said anoxic recycle stream into said anaerobic zone through said anaerobic zone inlet and discharging an anaerobic zone effluent from said anaerobic zone outlet, said anaerobic zone allowing biological absorption of substrate and simultaneous release of phosphorus under anaerobic conditions;

l. introducing said oxic zone recycle stream, said return activated sludge stream and said anaerobic effluent stream with said primary effluent stream to create a mixed liquor in said anoxic zone;

m. splitting said primary sludge stream into an excess primary sludge stream and a primary sludge fermenter influent stream;

n. introducing said primary sludge fermenter influent stream into said fermenter inlet and discharging a primary sludge decant stream from said liquid outlet and a primary sludge stream from said sludge outlet, said primary sludge decant stream providing a substrate source for the bacteria in said anaerobic zone;

o. introducing said primary sludge decant stream into said anaerobic zone inlet, said primary sludge decant stream and said anaerobic zone influent stream mixing to create a mixed liquor in said anaerobic zone;

p. said introduction of primary effluent into said anoxic zone providing means for effectively isolating said anaerobic zone from waste variability and from washout caused by abnormally high surges in wastewater flow;

q. maintaining conditions in said anaerobic zone so as to contain less than 0.5 ppm $NO_x$ and less than 0.5 dissolved oxygen and thereby causing absorption of said substrate by said bacteria present in said anaerobic zone, allowing a sufficient residence time of mixed liquor in said anaerobic zone to obtain a phosphorus release equal to 2–4 times the influent phosphorus concentration;

r. maintaining conditions in said anoxic zone so as to contain less than 0.5 ppm dissolved oxygen and thereby causing the anoxic denitrification by said bacteria of said anoxic zone mixed liquor; and s. maintaining conditions in said aerobic zone so as to contain greater than 0.5 ppm dissolved oxygen and thereby causing aerobic oxidation of said BOD by said bacteria present in mixed liquor in said aerobic zone, the biological nitrification of nitrogenous compounds, and causing phosphorus uptake by bacteria present in said mixed liquor to remove phosphorus compounds from said mixed liquor in said oxidation zone.

* * * * *